United States Patent [19]

Flender

[11] Patent Number: 5,748,604
[45] Date of Patent: May 5, 1998

[54] CHANGER FOR INFORMATION CARRIERS, HOLDER SUITABLE FOR USE IN SAID CHANGER, AND SCANNING SYSTEM COMPRISING SAID HOLDER

[75] Inventor: Gregg Flender, Quincy, Mass.

[73] Assignee: U.S. Philips Corporation, New York, N.Y.

[21] Appl. No.: 762,259

[22] Filed: Dec. 9, 1996

Related U.S. Application Data

[63] Continuation of Ser. No. 401,065, Mar. 8, 1995, abandoned.

[30] Foreign Application Priority Data

Mar. 31, 1994 [EP] European Pat. Off. .............. 94200900

[51] Int. Cl.⁶ .................................................. G11B 17/10
[52] U.S. Cl. ....................................................... 369/192
[58] Field of Search ........................... 369/36–38, 75.1, 369/178, 191–192; 206/308.1, 308.3, 307.1, 313, 387.1, 387.14, 387.15; 360/92

[56] References Cited

U.S. PATENT DOCUMENTS

| | | | |
|---|---|---|---|
| 4,403,316 | 9/1983 | van de Veerdonk | 369/44 |
| 4,722,439 | 2/1988 | Grobecker et al. | 206/309 |
| 4,996,681 | 2/1991 | Cocco et al. | 369/273 |
| 5,097,946 | 3/1992 | Emrich | 206/309 |
| 5,099,465 | 3/1992 | Geiger et al. | 369/36 |
| 5,117,409 | 5/1992 | Shimuzu et al. | 369/36 |
| 5,191,569 | 3/1993 | Kurosawa et al. | 369/38 |

FOREIGN PATENT DOCUMENTS

3715164 11/1988 Germany .
60-258759 12/1985 Japan .

*Primary Examiner*—Robert S. Tupper
*Assistant Examiner*—George J. Letscher
*Attorney, Agent, or Firm*—Ernestine C. Bartlett

[57] ABSTRACT

A changer for information carriers, has a magazine section with a magazine for storing information carriers above one another, and a scanning section extending parallel to the magazine section and having means for inscribing and/or reading information carriers. The magazine has holders disposed above one another both for storing information carriers above one another and for storing storage boxes for information carriers above one another. The holders have a first holder part (13a), disposed adjacent the scanning section, for supporting an information carrier (15), and a second holder part (13b), disposed adjacent the first holder part, for storing a storage box (17) for an information carrier.

10 Claims, 7 Drawing Sheets

CHANGER FOR INFORMATION CARRIERS, HOLDER SUITABLE FOR USE IN SAID CHANGER, AND SCANNING SYSTEM COMPRISING SAID HOLDER

This is a continuation of application Ser. No. 08/401,065, filed Mar. 8, 1995 now abandoned.

BACKGROUND OF THE INVENTION

The invention relates to a changer for information carriers, comprising a magazine section with a magazine for storing information carriers above one another, and a scanning section extending parallel to the magazine section and comprising means for inscribing and/or reading information carriers.

Such a changer is known from DE-A 37 15 164 A1. The known changer is a CD changer and has, for example, a vertically disposed stationary magazine and a scanning device which is movable up and down along the magazine. The magazine has a plurality of compartments disposed above another and adapted to receive optical discs. The scanning device comprises a light source and a turntable and has means, for example a slide controlled by a Bowden cable, for transferring an optical disc from a compartment of the magazine to the turntable and vice versa.

Information carriers such as CDs are generally put on the market in storage boxes. Such a storage box contains externally visible information about the information carrier stored in it and, usually, further information in the form of a leaflet or a booklet. To scan the information carriers they have to be removed from their storage boxes. When the known changer is used the storage of the empty storage boxes poses a problem owing to the large number of information carriers which can be stored. Another problem associated with the use of the known changer is the filing of the information carriers loaded into the changer and the retrieval of the information carriers because it is not visible from the exterior where a given information carrier is located.

SUMMARY OF THE INVENTION

It is an object of the invention to provide a changer for information carriers, which is constructed so as to enable the storage boxes to be utilised effectively and so as to facilitate the filing of information carriers.

To this end the changer in accordance with the invention is characterised in that the magazine comprises holders disposed above one another both for storing information carriers above one another and for storing storage boxes for information carriers above one another, which holders comprise a first holder part for supporting an information carrier, which first holder part is disposed adjacent the scanning section, and a second holder part for storing a storage box for an information carrier, which second holder part is disposed adjacent the first holder part.

The changer in accordance with the invention enables empty storage boxes to be utilised effectively. Since each holder can hold both an information carrier and its associated storage box, the storage box facing outward with its information-containing side, the information carriers present in the changer in accordance with the invention can be located easily by a user of the changer.

The first holder part and the second holder part of each holder used in the changer in accordance with the invention may be disposed in the same plane or may be offset relative to one another. The holders may be suited for disc-shaped information carriers, such as optical discs, magneto-optical discs or magnetic discs, or for tape-like information carriers, such as for example a magnetic tape accommodated in a cassette or housing.

An embodiment of the changer in accordance with the invention is characterised in that the holders are adapted to be inserted into and removed from the magazine. This measure makes it easier to place an information carrier onto the first holder part of a holder.

An embodiment of the changer in accordance with the invention is characterised in that the first holder part of each holder has a supporting surface for an information carrier. A supporting surface adapted to the shape of the information carrier or its housing guarantees a stable support of the information carrier.

An embodiment of the changer in accordance with the invention is characterised in that the first holder part has an insertion opening for an information carrier at its side facing the scanning section. This insertion opening, which will generally be a slot, bounds a space in the first holder part, into which space the information carrier can be inserted.

An embodiment of the changer in accordance with the invention is characterised in that the first holder part has guide means for an information carrier, which guide means extends from the insertion opening for an information carrier. This facilitates sliding the information carrier into and out of the holder.

An embodiment of the changer in accordance with the invention is characterised in that the second holder part has a supporting surface for a storage box for an information carrier and has a window in a wall which is remote from the scanning section. The window serves to provide access to the information on the storage box supported by the holder. Such information may relate to, for example, the title or the artist(s) performing the music stored on the information carrier.

An embodiment of the changer in accordance with the invention is characterised in that the second holder part has an insertion opening for a storage box for an information carrier at its side which is remote from the scanning section. This insertion opening adapted to the shape of the storage box makes it possible to slide storage boxes into and/or out of the holders without the holders themselves being moved.

An embodiment of the changer in accordance with the invention is characterised in that the second holder part has a guide member for a storage box, which guide member extends from the insertion opening for a storage box. This guarantees an easy insertion and removal of the storage box into/from the holder.

An embodiment of the changer in accordance with the invention is characterised in that the holders have archiving elements on a wall portion which is remote from the scanning section. These elements, which may be detachable and which comprise mutually different characters, for example figures or letters, can be used effectively in programming the changer.

An embodiment of the changer in accordance with the invention is characterised in that at least the scanning section has an at least partly transparent housing, thereby enabling internal parts of the changer to be observed from the exterior.

The invention further relates to a holder suitable for use in the changer in accordance with the invention. To this end the holder in accordance with the invention comprises a first holder part for supporting an information carrier and a second holder part for holding a storage box of an information carrier, which second holder part is disposed adjacent the first holder part. The holder can be injection-moulded from a suitable synthetic material such as polypropylene.

The invention further relates to a scanning system for inscribing and/or reading an information carrier, such as an optical disc, for example a CD, or a magnetic tape accommodated in a cassette, for example a DCC cassette. The scanning system in accordance with the invention comprises a holder in accordance with the invention.

The invention will be described in more detail, by way of example, with reference to the drawings.

DESCRIPTION OF THE PREFERRED EMBODIMENT

The changer in accordance with the invention shown in FIGS. 1A to D has a comparatively slender housing 1 which is elongate viewed in a vertical direction and which comprises a magazine section 3 and a scanning section 5. In the present example the scanning section 5 is situated in a transparent housing part 1a of a housing 1 carried by a pedestal 2a.

The changer shown is intended for reading optical discs, particularly Compact Discs. For this purpose the scanning section 5 in the present example has a scanning unit 7, which is movable along a guide member 9. The scanning unit comprises a turntable for supporting an information carrier and a light source for forming a scanning spot on an information surface of the information carrier by means of an objective. Such a scanning unit is described in more/detail in, for example, U.S. Pat. No. 4,403,316 (herewith incorporated by reference). It is obvious that instead of one scanning unit two or even more scanning units may be used. The use of two or more scanning units has the advantage that the break between the successive scanning of two optical discs can be very short.

The magazine section 3 of the changer in accordance with the invention has a magazine 3a for a plurality of, for example, one hundred holders 11 which are disposed vertically above one another and which can be slid into and out of the magazine 3a along guide members 13. The holders 11 are constructed in such a way that they can each hold both an information carrier and a storage box for the information carrier. A suitable holder 11 is shown in detail in FIGS. 2 to 6.

The plastics holder 11 in accordance with the invention shown in FIGS. 2 to 6 comprises a first holder part 13a for supporting a disc-shaped information carrier 15 and an adjoining second holder part 13b for holding a storage box 17. Such a storage box is disclosed in, for example, U.S. Pat. No. 4,722,439 (herewith incorporated by reference). At opposite sides the holder has a guideway 19 for cooperation with the guide members 13 of the magazine 3a. In the slid-in position of the holder 11 in the magazine 3a the first holder part 13a is disposed adjacent the scanning section 5 of the changer and an information carrier supported by the holder 11 can be removed from the holder 11 by suitable means and can be moved to the scanning unit 7a or 7b, which has been brought into a facing position. In the slid-in position of the holder 11 in the magazine 3a the second holder part 13b is disposed adjacent a front 1b of the housing 1, and a side wall 17a of a storage box 17 disposed in the holder 11 is situated in or near the front 1b. As a result, information situated on or, in the case of a transparent storage box, behind the side wall 17a and relating to the relevant information carrier situated in the storage box, for example a title, is visible from the exterior. Thus, the location of a given information carrier can be determined easily by a user of the changer in accordance with the invention. Preferably, the various holders 11 have archiving elements 21, which are secured to a front wall 13c of the holder 11 by, for example, snap-on means.

At a rear side 13d, i.e. the side facing the scanning section 5 when the holder 11 has been slid into the magazine 3a, the first holder part 13a of the holder 11 shown in FIGS. 2 to 6 has a slot-shaped insertion opening 23 for the insertion of the disc-shaped information carrier 15 into the holder 11. The holder 11 has two semicircular surfaces 25a and 25b extending from the insertion opening 23, which surfaces bound a gap-like space 27 and serve as guide means for the information carrier 15 to be inserted or removed. The lower surface 25a also serves as a supporting surface for the inserted information carrier.

The second holder part 13b has two parallel elongate members or limbs 29a and 29b, which serve as guide means for the insertion and removal of the storage box 17, a surface 31 serving to support the storage box 17.

Figure 1A:
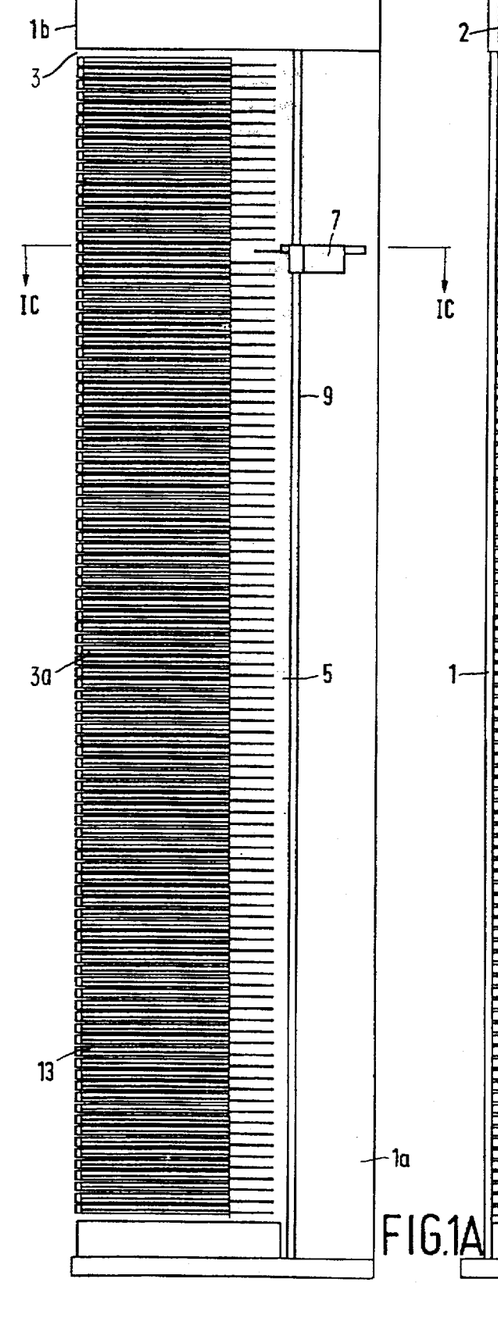
FIG. 1A is a side view showing an embodiment of the changer in accordance with the invention.
Figure 1B:
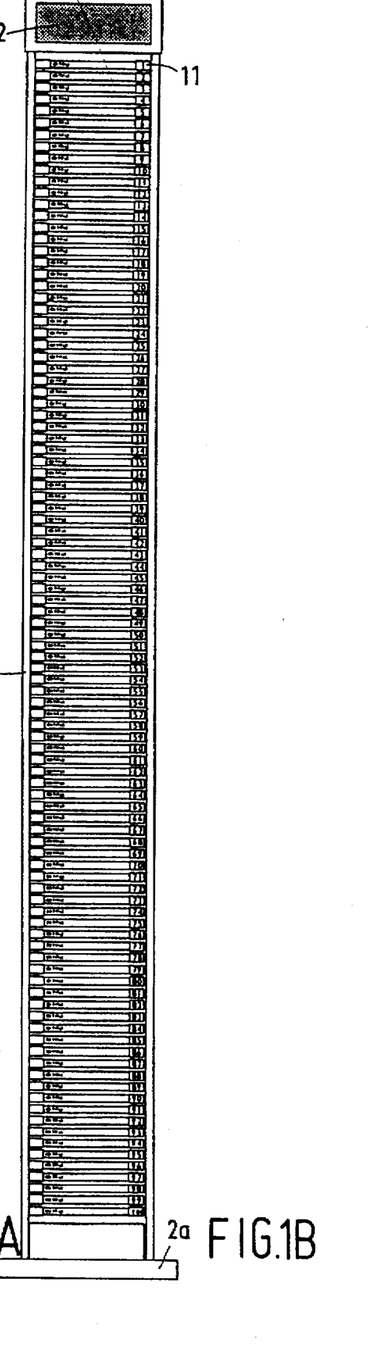
FIG. 1B is a front view of the changer shown in FIG. 1A.
Figure 1C:
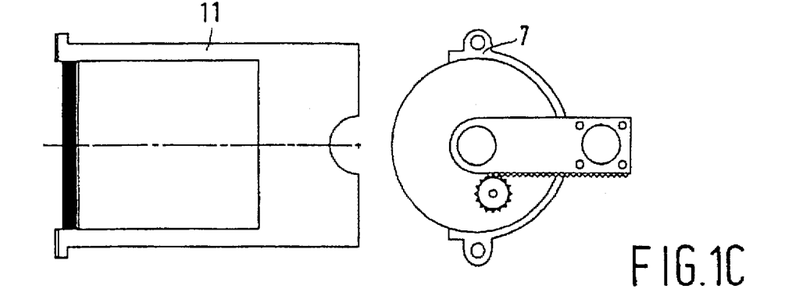
FIG. 1C is a sectional view in an enlarged scale according to plane Ic—Ic in FIG. 1A.
Figure 1D:
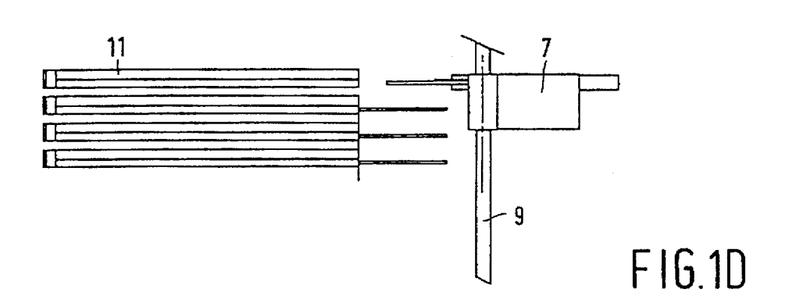
FIG. 1D is a side view in an enlarged scale of a portion of the embodiment of FIG. 1A.
Figure 2:
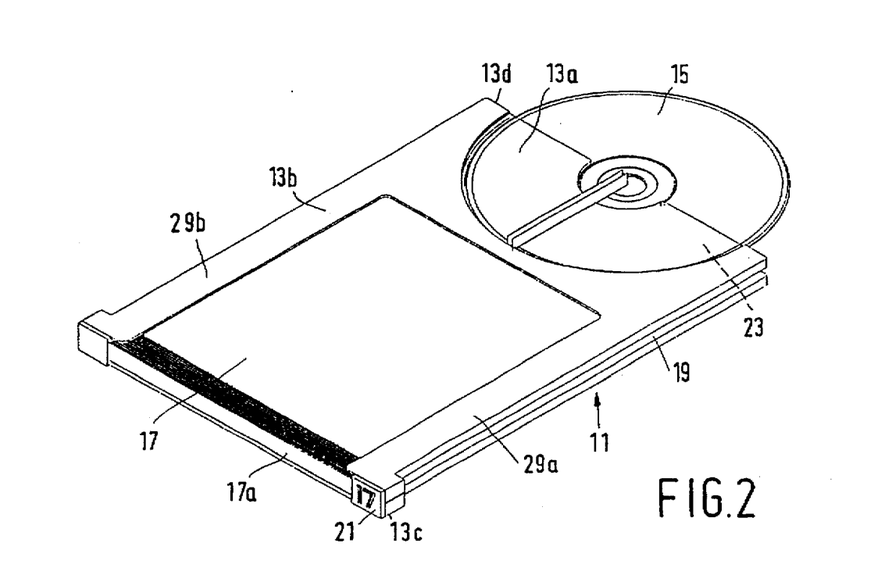
FIG. 2 is a perspective view showing a first embodiment of the holder in accordance with the invention, provided with a disc-shaped information carrier.
Figure 3:
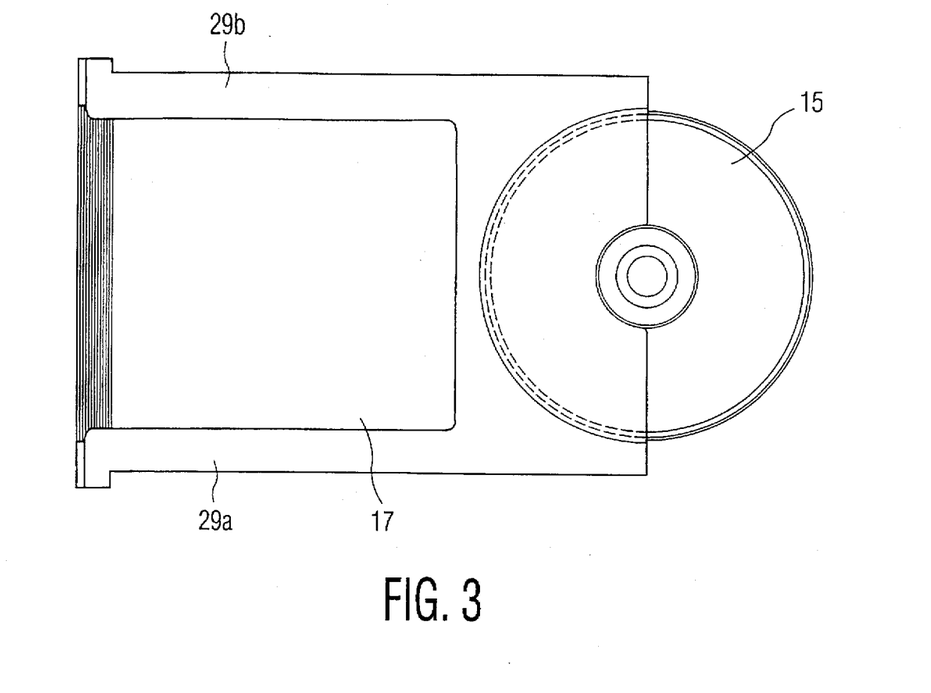
FIG. 3 is a plan view of the holder shown in FIG. 2.
Figure 4:
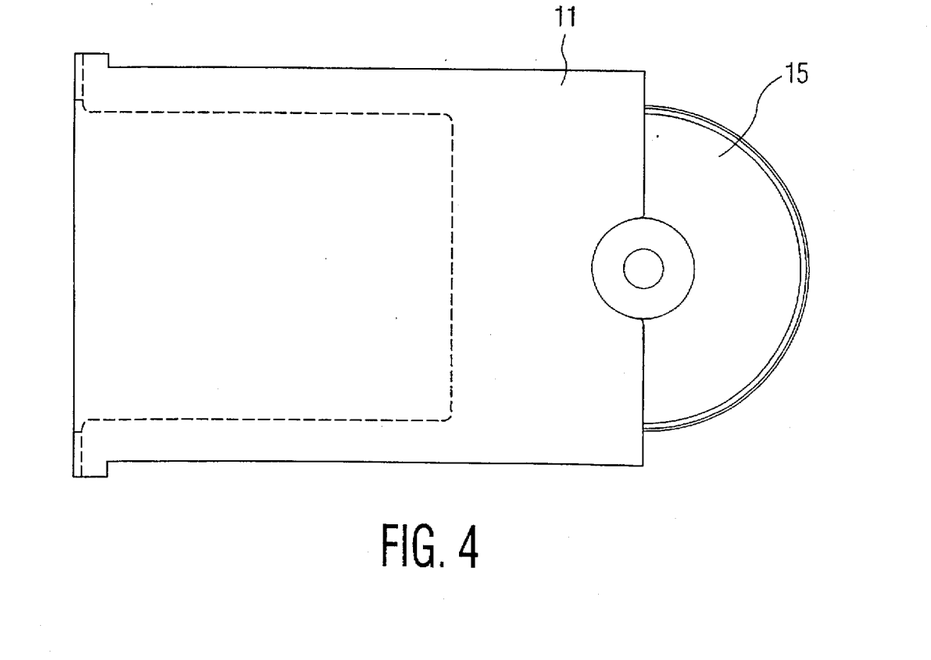
FIG. 4 is an underneath view of the holder shown in FIG. 2.
Figure 5:
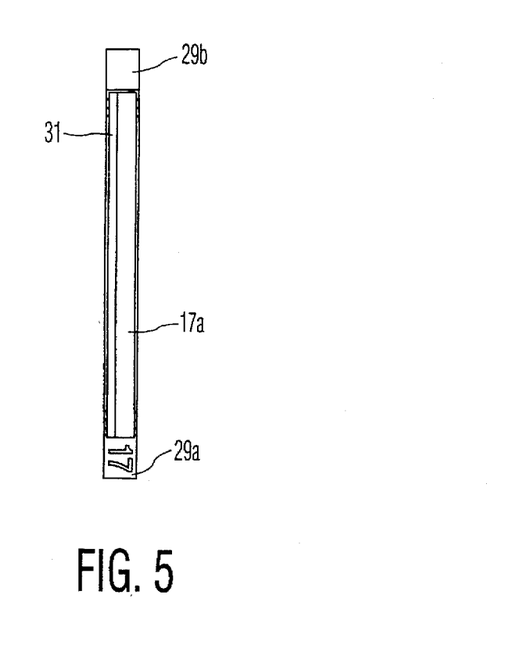
FIG. 5 is a front view of the holder shown in FIG. 2.
Figure 6:
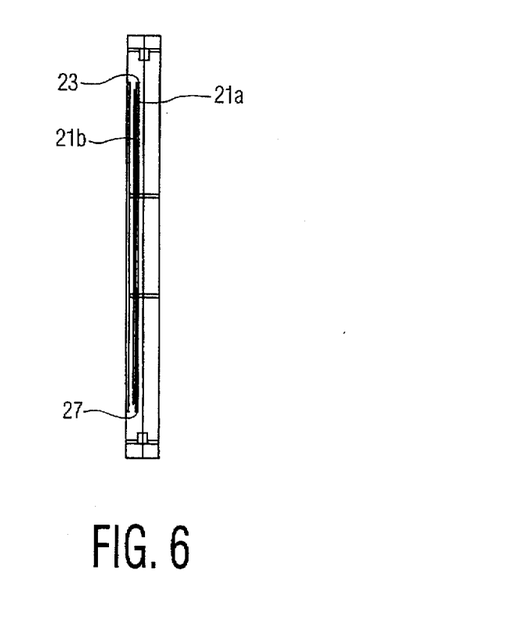
FIG. 6 is a rear view of the holder shown in FIG. 2.
Figure 7:
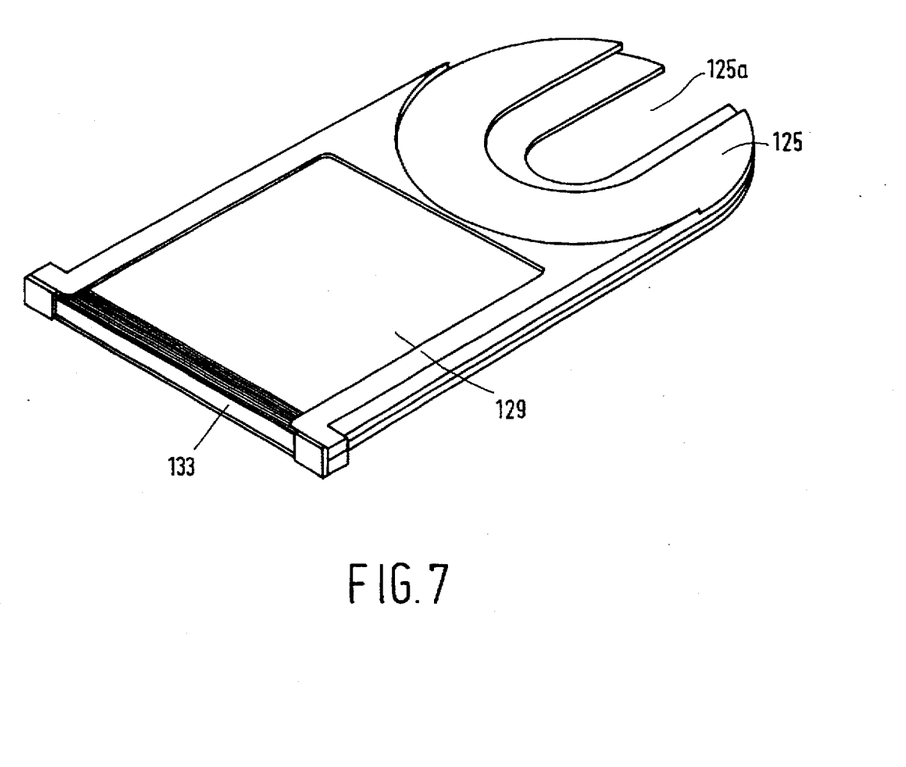
FIG. 7 is a perspective view showing a second embodiment of the holder in accordance with the invention.

FIG. 7 shows a second embodiment of the holder in accordance with the invention. This holder has a first holder part 113a and an adjoining second holder part 113b. The first holder part 113a has a recessed circular supporting surface 125 for supporting a disc-shaped information carrier. The supporting surface has an opening 125a. The second holder part 113b has a space 129 for holding the storage box of the information carrier to be placed onto the supporting surface 125, and further has a window 133.

The changer in accordance with the invention shown in the Figures forms part of a scanning system which in addition to the scanning section and magazine section shown herein comprises further parts, such as for example electronic units for scanning, controlling and memory functions. The special features used in the changer enable information relating to the information carriers such as titles and, if applicable, names of composers and/or performing artists, to be organised in such a manner that the changer becomes a music library at the user's fingertips. Complete control of a collection of information carriers present in the changer is possible via a remote control device. At its front 1b the changer has a display 2 for displaying current information during scanning of an information carrier.

For scanning an information carrier the scanning unit 7 is brought to a correct position relative to the information carrier to be scanned. This can be effected, for example, by means of a drive unit as disclosed in JP-A 60-258759. Such a drive unit comprises an electric motor which, via a transmission device, moves the scanning unit in a vertical direction into the desired position relative to the information carrier to be scanned. Subsequently, the selected information carrier is transferred from the holder to the scanning unit by means of a transfer mechanism. This may be effected, for example, by means of the transfer mechanism as disclosed in said JP-A 60-258759 or a modification thereof. Such a mechanism comprises a gripper which is movable parallel to the main surface of the information carrier and which can slide the information carrier out of the holder into a position opposite the turntable. By subsequently moving the turntable and the information carrier towards one another, for example by moving the turntable, the information carrier can be brought into a scanning position. When scanning has been completed the turntable and the information carrier can be separated from one another and the information carrier can be returned to the holder in the magazine by means of said transfer mechanism.

In the FIGS. 8A to 8H a drive unit 201 for positioning the scanning unit 7 of the changer in according to the invention relative to a desired information carrier 15 in a holder 11 present in the changer is shown. The drive unit 201 is provided with an electric motor and a gear 202 for moving the scanning unit 7 up and down along the guiding member 9. The FIGS. 8A to 8H further show a transfer mechanism 203 for transferring a selected information carrier 15 between the holder 11 and the scanning unit 7. The transfer mechanism 203 is provided with three arms 204, 206 en 208 and two gears 210 and 212.

Figure 8A:
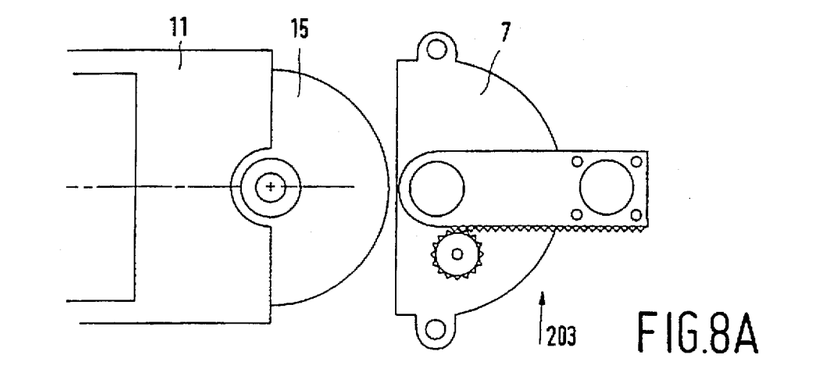
FIGS. 8A to 8H show an embodiment of a drive unit and a transfer mechanism used in the changer shown in FIG. 1A.
Figure 8B:
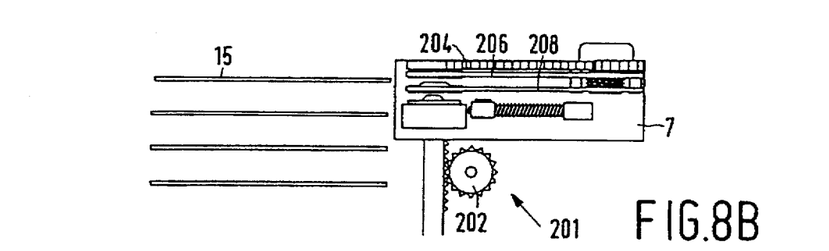

When the scanning unit 7 has reached the desired information carrier 15—see FIGS. 8A and 8B—by means of the gear 202 the transfer mechanism 203 is activated, the main arm 204 moving in a horizontal plane between the scanning unit 7 and the holder 11 in the magazine by means of an electric motor and the gear 210. The arms 206 and 208, which suspend from and move with the main arm 204, are provided with parts 206a and 208a freely rotatable within the arm which carries them.

Figure 8C:
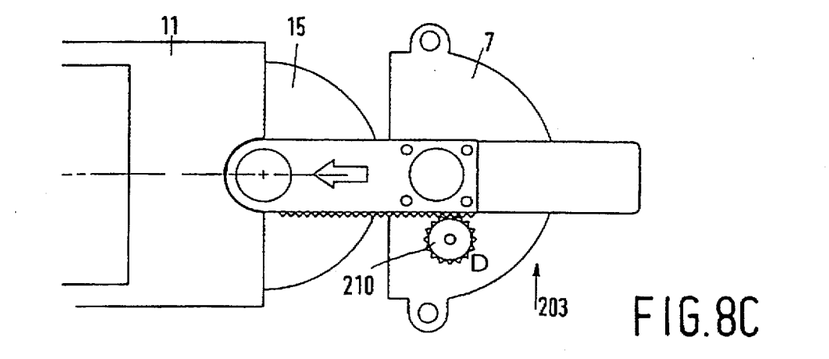
Figure 8D:
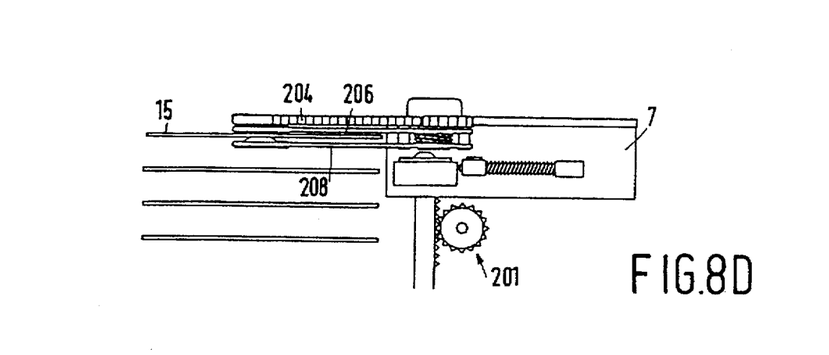
Figure 8E:
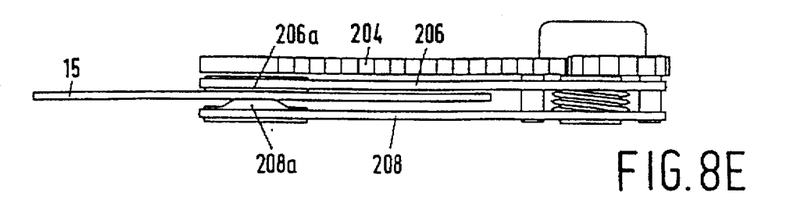
Figure 8F:
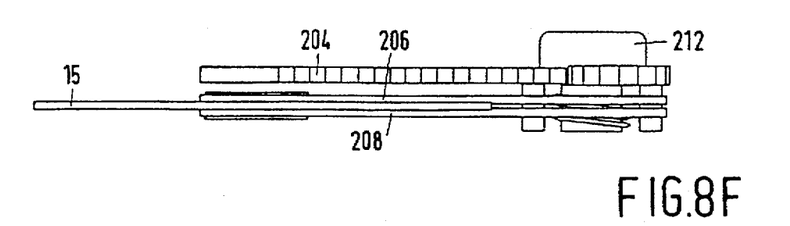

When the arm 204 has reached the end of its travel—see FIGS. 8C and 8D—, the arms 206 and 208 are moved vertically together by means of an electric motor and the gear 212 fixed to the arm 204. Due to this movement, the parts 206a and 208a grasp the selected information carrier 15 at its center—see FIGS. 8E and 8F.

Figure 8G:
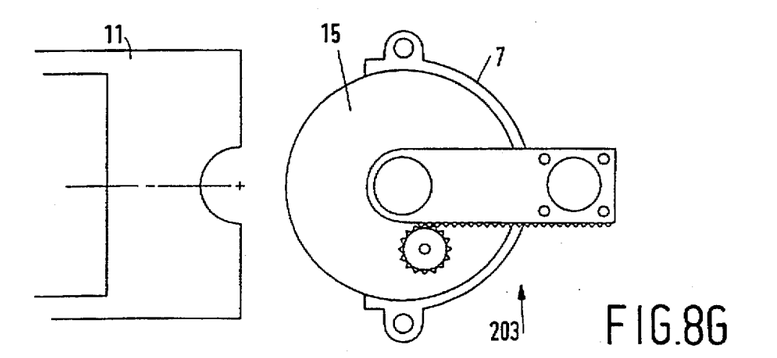
Figure 8H:
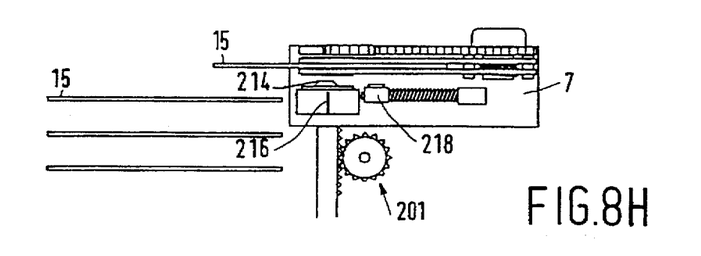

When the transfer mechanism returns with the information carrier 15 to the scanning unit 7 one of several actions could take place. A possible action is that the final movement of the transfer mechanism 203 is downward and thus placing a bottom portion of the part 208a on a rotatable turntable or spindle 214 of a driving motor 216 of the scanning unit 7 for supporting the information carrier 15. During rotating of the turntable 214 the information carrier 15 can be scanned by means of a light pen 218. Another possible action is that the driving motor 216 and the light pen 218 are moved vertically to a correct position by means of another electric motor. It is also possible to make the bottom of the part 208a in such a way that it will thread itself onto and off of the rotatable spindle 214 as it passes over the driving motor 216. The arm 208 has at its bottom side an area removed to allow the information carrier 15 to be read by the light pen 218. After the information carrier 15 has been returned to the magazine in a reverse order, a next information carrier 15 can be reached by the gear 210.

It is to be noted that the invention is not limited to the exemplary embodiments disclosed herein. For example, the changer may be a changer for magnetic-tape cassettes. Moreover, the changer may comprise a plurality of magazines.

I claim:

1. A changer for information carriers, comprising a magazine section with a magazine for storing information carriers above one another along a vertical plane, and a scanning section extending parallel to said vertical plane and comprising means for inscribing and/or reading information to and/or from said carriers, characterized in that the magazine comprises holders disposed one above the other in said vertical plane for storing information carriers one above the other and for storing storage boxes for information carriers one above the other, each of which holders comprise a first holder part having a first supporting surface for supporting an information carrier which first holder part is disposed adjacent said scanning section, and a second holder part for storing a storage box for an information carrier, and having a second supporting surface for supporting the storage box which second holder part is disposed adjacent to and in substantially the same plane as said first holder part, means for moving said inscribing and/or reading means along said scanning section and means for providing access for said inscribing and/or reading means to an information carrier while said information carrier is not moved along said vertical plane.

2. A changer as claimed in claim 1, characterised in that the holders are adapted to be inserted into and removed from the magazine.

3. A changer as claimed in claim 1, characterised in that the first holder part of each holder has a supporting surface for an information carrier.

4. A changer as claimed in claim 1, characterised in that the first holder part has an insertion opening for an information carrier at its side facing the scanning section.

5. A changer as claimed in claim 4, characterised in that the first holder part has a guide means for an information carrier, which guide means extends from the insertion opening for an information carrier.

6. A changer as claimed in claim 1, characterised in that the second holder part has a supporting surface for a storage box for an information carrier and has a window in a wall which is remote from the scanning section.

7. A changer as claimed in claim 1, characterised in that the second holder part has an insertion opening for a storage box for an information carrier at its side which is remote from the scanning section.

8. A changer as claimed in claim 7, characterised in that the second holder part has a guide member for a storage box, which guide member extends from the insertion opening for a storage box.

9. A changer as claimed claim 1, characterised in that the holders have archiving elements on a wall portion which is remote from the scanning section.

10. A changer as claimed claim 1, characterised in that at least the scanning section has an at least partly transparent housing.

* * * * *